United States Patent [19]

Volkmann et al.

[11] Patent Number: 5,414,053
[45] Date of Patent: May 9, 1995

[54] THERMOFORMABLE, THERMOSETTABLE ADHESIVES PREPARED FROM EPOXY RESINS AND POLYESTERS AND/OR POLYCARBONATES

[75] Inventors: Curtis L. Volkmann, Brighton, Mich.; Theodore L. Parker, Alpharetta, Ga.

[73] Assignees: Essex Specialty Products, Inc., Clifton, N.J.; The Dow Chemical Company, Midland, Mich.

[21] Appl. No.: 81,588

[22] Filed: Jun. 23, 1993

[51] Int. Cl.[6] .................... C08F 20/00; C08F 283/02; B32B 17/10; B32B 27/38
[52] U.S. Cl. .................... 525/438; 525/463; 427/208.2; 427/372.2; 427/386; 428/415
[58] Field of Search .......... 525/107, 108, 109, 118, 525/187, 208, 438, 463, 113; 427/208.2, 372.2, 386; 428/415

[56] References Cited

U.S. PATENT DOCUMENTS

| | | | |
|---|---|---|---|
| 3,947,522 | 3/1976 | Shelley, Jr. et al. | 525/107 |
| 4,731,416 | 3/1988 | Saunders | 525/131 |
| 4,746,725 | 5/1988 | Evans et al. | 528/370 |
| 4,782,124 | 11/1988 | Hefner, Jr. et al. | 525/463 |
| 5,037,903 | 8/1991 | Parker | 525/438 |
| 5,045,632 | 9/1991 | Parker | 562/45 |
| 5,105,006 | 4/1992 | Parker | 562/30 |

Primary Examiner—Paul R. Michl
Assistant Examiner—Patrick Niland
Attorney, Agent, or Firm—Norman L. Sims

[57] ABSTRACT

Described herein is an adhesive composition comprising (a) an aromatic polyester or aromatic polycarbonate, (b) a polyepoxide, (c) an effective amount of an initiator or catalyst for the reaction of carbonate or ester groups in the aromatic polycarbonate or aromatic polyester with oxirane groups in the polyepoxide, and (d) from about 1 to about 50 weight percent of (i) a polymeric material different from (b) with pendant epoxy groups and a glass transition temperature below about 50° C., or (ii) a solution of a copolymer of an an alkyl ester of an $\alpha,\beta$-ethylenically unsaturated carboxylic acid and a hydroxyalkyl ester of an $\alpha,\beta$-ethylenically unsaturated carboxylic acid, in a polyether polyol having a molecular weight of at least about 200; wherein the number ratio of oxirane groups in component (b) to the sum of the number of ester groups and twice the number of carbonate groups in component (a), is in the range of from about 0.8:1 to about 1.4:1. The composition of the invention has been discovered to be useful as a film adhesive in processes for bonding oily metal substrates.

9 Claims, No Drawings

THERMOFORMABLE, THERMOSETTABLE ADHESIVES PREPARED FROM EPOXY RESINS AND POLYESTERS AND/OR POLYCARBONATES

BACKGROUND OF THE INVENTION

This invention relates to epoxy/polyester/polycarbonate compositions, and more specifically, to such compositions for adhesive applications.

It is known to prepare one-component adhesives for applications wherein the adhesive is cured at an elevated temperature such as, for example, above about 100° C. Such adhesive compositions are particularly useful in manufacturing processes wherein the apparatus to be assembled is to be also painted and sent though a paint oven, such as in the manufacture of automobiles, appliances, and office furniture, or in manufacturing applications wherein the assembly process permits a separate heat-cure step inorder to achieve higher adhesive strength, such as in the manufacture of aircraft. Such compositions typically comprise a curing agent which is solid at ambient temperatures, dispersed in a resin which is liquid at ambient temperatures. Examples of such compositions include those comprising solid polyamines dispersed in liquid epoxy resins, and solid polyisocyanates dispersed in liquid polyols. Such compositions are typically applied as an adhesive to a substrate to be bonded and sheated to a temperature high enough to melt the curing agent sufficiently to allow it to quickly cure the liquid resin.

However, such compositions are not storage stable at ambient temperatures. Under storage conditions, the solid/liquid components of such compositions will still be able to react to a limited degree and cure the composition over time.

It is also known to prepare compositions comprising epoxy resins, aromatic polyesters or aromatic polycarbonates, and particular catalysts, as described, for example, in U.S. Pat. No. 5,037,903. Such compositions are taught in this patent to be useful for preparing thermoformed articles and as the matrix material for polymeric composites. However, such compositions are typically too brittle at ambient temperatures for application as an adhesive.

It would be desirable to provide an adhesive composition which is suitable for application as an adhesive at ambient temperatures, yet which has a long storage life.

SUMMARY OF THE INVENTION

In one aspect, this invention is an adhesive composition comprising
(a) an aromatic polyester or aromatic polycarbonate,
(b) a polyepoxide,
(c) an effective amount of an initiator or catalyst for the reaction of carbonate or ester groups in the aromatic polycarbonate or aromatic polyester with oxirane groups in the polyepoxide, and
(d) from about 1 to about 50 weight percent of (i) a polymeric material different from (b) with pendant epoxy groups and a glass transition temperature below about 50° C., or (ii) a solution of a copolymer of an an alkyl ester of an $\alpha,\beta$-ethylenically unsaturated carboxylic acid and a hydroxyalkyl ester of an $\alpha,\beta$-ethylenically unsaturated carboxylic acid, in a polyether polyol having a molecular weight of at least about 200;
wherein the number ratio of oxirane groups in component (b) to the sum of the number of ester groups and twice the number of carbonate groups in component (a), is in the range of from about 0.8:1 to about 1.4:1.

In its second aspect, this invention is a method for bonding two substrates which comprises:
applying the adhesive composition of the first aspect of the invention between two substrates and heating the adhesive under conditions sufficient to at least partially wet the substrates and cure the adhesive.

This invention provides a structural adhesive which is particularly useful for the bonding of metal substrates. The adhesive of the invention advantageously provides improved adhesive properties, such as lap shear strength and peel strength, relative to epoxy/polycarbonate/polyester compositions which do not contain the adhesion-enhancing material of component (d) of the adhesive of the invention. The adhesive of the invention also provides improved storage stability at ambient conditions, relative to the typical epoxy and polyurethane structural adhesives described above. These and other advantages of the invention are apparent from the description below.

DETAILED DESCRIPTION OF THE INVENTION

Polyepoxides useful in the preparation of the composition of the invention preferably contain an average of at least two oxirane groups per molecule, contained in a glycidyl ether, glycidyl ester, glycidyl amine, glycidyl hydantoin, or hydrocarbon epoxide group. The term "aromatic" as used herein, includes heteroaromatic. The terms "epoxide", "epoxy" or "polyepoxide" refer to oxirane compounds having an average oxirane functionality of about 1.5 or more.

Suitable polyepoxides may be compounds having an average of about 1.5 or more oxirane groups per molecule.

When the polyepoxide is of such high molecular weight that is not—as such—compatible with the carbonate/ester component, it may be possible to render it so, if it includes a substantial number of active hydrogen functions, by converting the latter to —CO—OR or —O—CO—OR groups. The term "compatible" as used herein means that the two components are miscible without requiring the presence of a solvent. That is, if a mixture of the polyepoxide, and the carbonate/ester is melted, or if a hot solution of the epoxide and carbonate/ester in a solvent is stripped of the solvent to a final temperature at which the residue mixture is molten, the resulting melt is a homogeneous dispersion or solution. Alkyl hydroxyl groups in the epoxide may be converted to carbonate groups by transesterification in a conventional manner. U.S. Pat. No. 4,782,124 discloses suitable transesterification catalysts and is incorporated herein by reference for all purposes which may legally be served thereby.

Examples of suitable polyepoxides are diolefin diepoxides, vinylcycloalkene dioxides, dicyclodiolefin dioxides, divinylbenzene dioxide, diallylbenzene dioxide, the dioxide of biscyclopentenyl ether; the dioxide of p,p'-divinyldiphenyl, the dioxides of divinyl diphenylsulfide and -oxide; diglycidyl ether, the diglycidyl ethers of dihydroxy benzenes and dinuclear diphenols ("bisphenols", most notably the diglycidyl ether of bisphenol A) and the diglycidyl esters of diacids.

Other suitable polyepoxides are hydantoin polyepoxides, such as, for example, N,N'-diglycidyl hydantoins, 1-glycidyl-3-(2,3-diglycidyloxy-prop-1-yl) 5,5-dimethylhydantoin and 1,3-di-(1-glycidyl-5,5-dimethyl-hydantoin-1-yl) -2-glycidyloxypropane. Dihydrouracils, barbituric acids, cyanuric and isocyanuric acids comprising 2 or 3 glycidyl groups are also suitable.

mulas 1, 2, 4 and 5 of course being present only in such amounts as correspond to n, n", n''' and n'''' values within the range of zero to about 0.2 respectively, or being first converted to inert or not detrimentally reactive derivative groups).

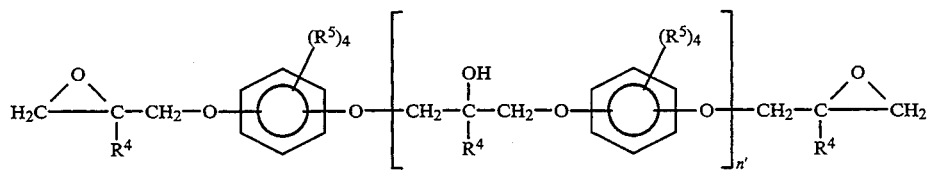

Formula 1

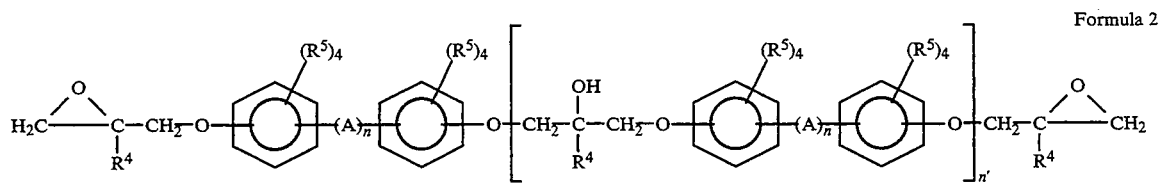

Formula 2

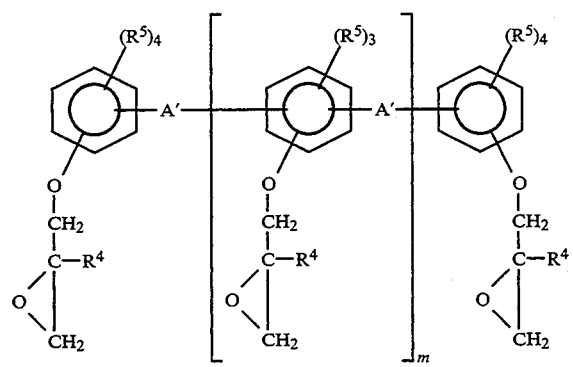

Formula 3

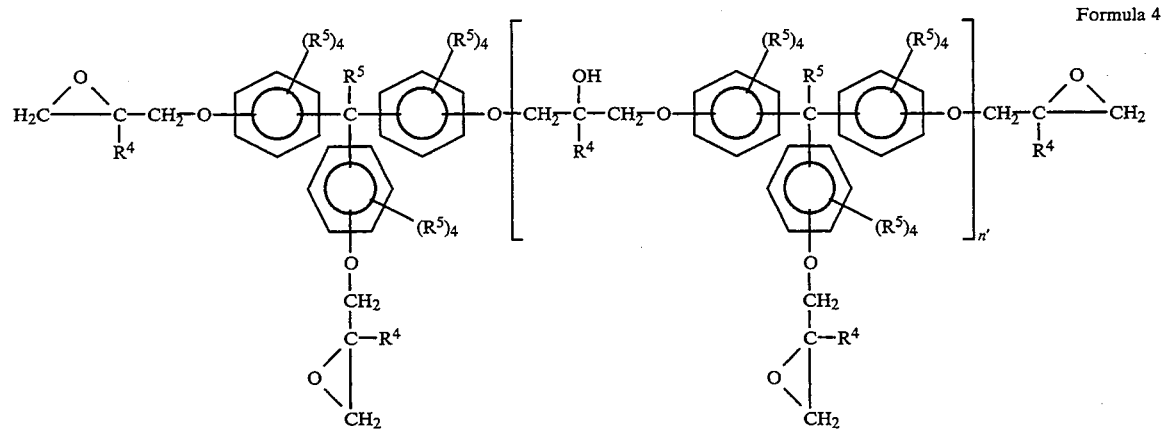

Formula 4

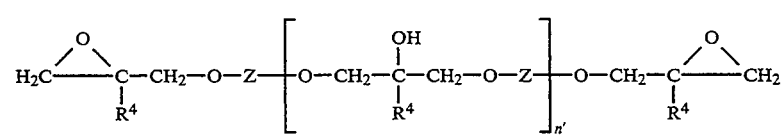

Formula 5

Other types of diepoxides, such as those containing silicon, phosphorous or other hetero atoms in linear, branched or cyclic segments of the molecule may also be suitable as the predominant component of an epoxy resin, either as the sole diepoxide employed in the oxirane/ester reaction or in admixture with other polyepoxides.

The polyepoxides of the following Formulas 1–5 are generally preferred for the practice of the present invention (the hydroxyl groups in polyepoxides of For-wherein A is a direct bond, a hydrocarbylene group having from 1 to about 12, preferably from 1 to about 6 carbon atoms,

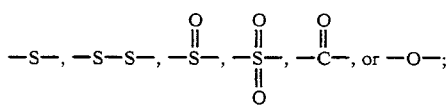

Z is hydrocarbylene group containing from 1 to about 15 carbon atoms or a —C($R^6$)$_2$—C($R^6$)$_2$—[O—C($R^6$)$_2$—C($R^6$)$_2$]—$_{m'}$ group; A' is a divalent hydrocarbylene group having from 1 to about 3, preferably 1, carbon atoms or a polycyclopentadienylidenyl radical—i.e.,

in which p has a value of from zero to about 10; in the foregoing Formulas 1–5, each $R^4$, independently, is H or $CH_3$; each $R^5$, independently, is H a $C_1$–$C_4$ alkyl, alkenyl or alkoxy group, bromo or chloro. Each $R^6$ is independently H or a $C_1$–$C_4$ hydrocarbyl radical; $R^7$ is H or a $C_1$–$C_{10}$ alkyl or alkenyl radical; m has a value of from about 0,001 to about 6; m' has a value of from about 1 to about 100; n has a value of from zero to about 60, preferably zero to about 20; n' has a value of from zero to about 40, preferably zero to about 0.2; n" has a value of from zero to about 5, preferably zero to about 3; n''' has a value of from zero to about 40, preferably zero to about 0.2; and Y is H, $R^8$, —CO—$R^8$ or —CO—O—$R^8$, $R^8$ being a $C_1$–$C_{15}$ hydrocarbyl radical, preferably a phenyl radical, with the restriction that the average number of Y's per molecule of said polyepoxide which are H is about 0.2 or less.

Exemplary of nominally difunctional polyepoxides of Formula 1 which actually have average oxirane functionalities of less than 2, but which are eminently suitable are liquid polyepoxides in which—in each occurrence—each of $R^4$ and $R^5$ are H and n is within the range of from 0 to about 0.15.

Particularly preferred are the following specific polyepoxides sold by The Dow Chemical Company: DER 383 TM, DER 332 TM, DER 331 TM, TACTIX 742 TM, DEN 438 TM, XD-71756.00 (a dicyclopentadiene/phenol epoxy novolac resin with and epoxide equivalent weight of about 230) and TACTIX 556 TM.

Suitable aromatic polyesters or aromatic polycarbonates for use in the preparation of the adhesive composition of the invention include any polymer or prepolymer which contains at least two groups of the formula —R—O—C(O)— or —R—O—C(O)—O— groups in which the R's are divalent aryl radicals such as, for example, phenylene and bis alkyl arylene. Such polyesters and polycarbonates include, for example, simple polyesters, polyetheresters, polyestercarbonates and polycarbonates. The term "aromatic polyester" and "aromatic polycarbonate" as used herein refers to a polymer chain in which the repeating units are of the formula —R—O—C(O)— or —R—O—C(O)—O—, as defined above. By "poly" is meant an average of at least two units per molecule.

Although the aromatic polyesters and aromatic polycarbonates may also contain non-aromatic carbonate or ester group moieties (carbonate or ester groups as shown above wherein R is not a divalent aryl radical), preferably all of the ester/carbonate groups are in the form of R—O—C(O)—R and R—O—C(O)—O—R groups in which the R's are aryl or arylene radicals.

Preferred aromatic polycarbonates are bisphenol A polycarbonates and polyestercarbonates prepared from bisphenol A, phosgene, terephthaloyl and isophthaloyl chlorides, the ester to carbonate group ratio being within the range of 2–4 and the tere- to isophthaloyl group ratio ranging from about 2:1 to about 4:1. Preferred polyesters are the fully aromatic species, wherein both "R" groups are aromatic groups, such as those derived from dihydric phenols and aromatic dicarboxylic acids.

The "fully aromatic" polyesters can be prepared by any of the well-known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213 and 3,133,898.

Also contemplated herein, although believed less suitable, are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

While the aromatic polyester and polycarbonates may be prepared by any suitable method, aromatic polyesters are typically prepared from the reaction of a carboxylic acid chloride and a dihydric phenol. Aromatic polycarbonates are typically prepared from a dihydric phenol and a carbonate precursor, such as phosgene.

Suitable dihydric phenols for the preparation of any of the foregoing types of polyesters and polycarbonates include those of the following Formulas 6 and 7:

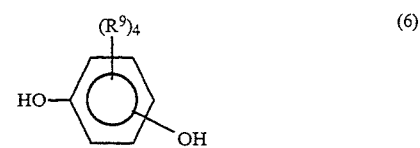

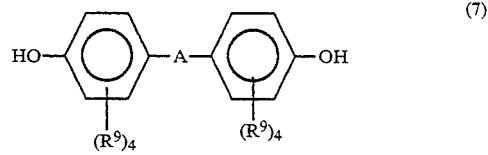

wherein each $R^9$ independently is H or a non-interfering substituent (such as halo, cyano, nitro or a hydrocarbyl group of up to 4 carbons, for example)
and
A is a direct bond, a hydrocarbylene group of 1 to about 12 carbon atoms,

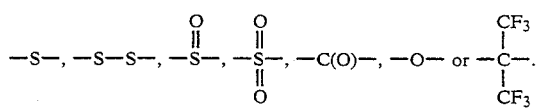

A is preferably a hydrocarbylene group of 1 to about 6 carbon atoms, and is more preferably isopropylidene.

Typical of some of the dihydric phenols that may be employed are bisphenol-A, bis(4-hydroxyphenyl)methane, 2,2-bis(4-hydroxy-3-methylphenyl)-propane, 4,4-bis(4-hydroxyphenyl)heptane, 2-2-(3,5,3',5'-tetrabromo-4,4'-dihydroxydiphenyl)propane, (3,3'-dichloro-4,4'-dihydroxydiphenyl)methane, and the like. Other dihydric phenols of the bisphenol type are described in, for example, U.S. Pat. Nos. 2,999,835, 3,028,365 and 3,334,154.

Suitable aromatic dicarboxylic acids for the preparation of the polyester include terephthalic acid, isophthalic acid, 1,2-di(p-carboxyphenyl)ethane, 4,4'-dicarboxydiphenyl ether, substituted dicarboxy compounds with two benzene nuclei, such as bis(p-carboxyphenyl)methane and p-carboxyphenyl/oxybenzoic acid, any of the naphthalene dicarboxylic acids such as 1,4- or 1,5-naphthalenedicarboxylic acids, and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferably, mixtures of isophthalic acid and terephthalic acid are used. The isophthalic acid to terephthalic acid ratio in the mixture is about 20:80 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polyester preparation.

Preferably, at least about 70 mole percent of the dicarboxylic acid incorporated into the polyester is terephthalic acid and at least about 70 mole percent of the aromatic diol incorporated into the polyester is bisphenol A.

Suitable aromatic polycarbonates that can be employed herein include polycarbonate homopolymers and copolymers and mixtures thereof. The polycarbonates may be prepared by reacting a dihydric phenol with a carbonate precursor. Examples of suitable dyhydric phenols are described above.

It is, of course, possible to employ two or more different dihydric phenols or a copolymer of dihydric phenol with a glycol or with hydroxy or acid terminated polyesters, or with a dibasic acid in the event a carbonate copolymer or inter-polymer is desired for use as the aromatic carbonate polymer.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed as such precursors are diphenyl carbonate, di-(halophenyl)carbonates, such as di-(chlorophenyl)carbonate, or di-(bromophenyl)carbonate, etc., di-(alkylphenyl)-carbonates such as di(tolyl)carbonate, di(naphthyl)carbonate, di(-chloronaphthyl)carbonate, etc. or mixtures thereof. The haloformates suitable for use herein include bishaloformates of dihydric phenols; for example, bischloroformates of bisphenol-A, or of hydroquinone, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, parabromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenylphosphonium bromide and methyl-triphenyl phosphonium bromide.

The polycarbonates can be prepared in a one-phase (homogeneous solution) or two-phase (interfacial) systems when phosgene or a haloformate are used. Bulk reactions are possible when the diarylcarbonate precursors are used.

Also, aromatic polyester carbonates may be used as the aromatic polyester or aromatic polycarbonate. These are described in, for example, U.S. Pat. No. 3,169,121. A preferred polyester carbonate results from the condensation of phosgene, terephthaloyl chloride, isophthaloyl chloride with bisphenol A and a small amount of p-tertbutylphenol.

The aromatic polycarbonates may be prepared by processes conducive to the formation of polymer chains terminated by carbonate groups (—O—CO—OR in which R is an aryl group—unsubstituted or including one or more non-interfering substituents) by well-known methods. See *Encyclopedia of Polymer Science and Technology*, Vol. 10, pp. 710-764 (1969); John Wiley & Sons, Inc., and Kirk-Othmer, *Encyclopedia of Chemical Technololy*, 3rd. Ed., Vol. 18, pp. 479-494 (1982); John Wiley & Sons, Inc.

Included as suitable polycarbonates are copolycarbonates (homo-bonded copolymers) derived from different dihydroxy compounds and copolycarbonates (hetero-bonded copolymers) having in the main chain a carbonate group and another group such as—for example—a siloxane moiety.

The polycarbonate may have a weight average molecular weight within the range from about 226 to about 35,000, but preferably is within the range of from about 350 to about 30,000; more preferably from about 10,000 to about 24,000.

The polyepoxide and aromatic polyester or polycarbonate are preferably combined in amounts such that the equivalent ratio of oxirane:ester groups is at least about 0.8:1, more preferably at least about 0.9:1, and most preferably at least about 0.95:1; and is preferably no greater that about 1.4:1, more preferably no greater than about 1.2:1, and most preferably no greater than about 1.1:1. (The polycarbonates will have two ester groups per carbonate group, of course.) Each ester group in the aromatic polyester or polycarbonate is capable of reacting with one oxirane group. Such ratios have been discovered to provide a sufficient amount of polyepoxide to result in improved physical or chemical properties, such as solvent resistance, in the partially or fully cured product, as compared to the polyester or polycarbonate per se.

It has been found that, in some instances, such as with bisphenol A polycarbonate and the diglycidyl ether of bisphenol A, the cured epoxy-polyester reaction product has a higher Tg (glass transition temperature) if there is present a small excess of the polyepoxide in the mixture of reactants—such as, for example, the excess corresponding to an oxirane to carbonate group ratio of 2:0.5, or 2.22:1.

The calculation of reactant weight ratios from the oxirane to "ester" number ratios is according to well-known principles, but it must be kept in mind that one carbonate group is, in effect, two reactive groups for the polyepoxide/carbonate reaction. The molecular weight of the repeating unit (which contains only one carbonate group) in a typical bisphenol A polycarbonate is 254, but the "reactive equivalent weight" of the polycarbonate is only half of 254, or 127. For a typical polyepoxide, DER 332 TM (which approximates the pure diglycidyl ether of bisphenol A), the EEW (grams of polyepoxide which provides one gram molecular weight of oxirane) is 172. So the weight ratio of polyepoxide to polycarbonate corresponding to a 2:1 number ratio of oxirane to carbonate groups is $(2 \times 172) \div 254$ or $172 \div 127 = 57.5 : 42.5$.

For an aromatic copolyestercarbonate in which the number ratio of carboxylate to carbonate groups is 3:1, the epoxy reactive equivalent weight as 162.34—based on one oxirane reacting with each carboxylate linkage and two oxiranes reacting with each carbonate group—the weight ratio of polyepoxide to polyester for a 1:1 "mole" ratio is 172/162.34 or 51.4/48.5.

Catalysts suitable for use in the preparation of the adhesive composition of the invention include any compound which will catalyze the reaction between an oxirane group and an ester group at a temperature below about 250° C. Examples of such catalysts include organophosphonium salts such as tetrabutylphosphonium acetate-acetic acid complexes, tetrabutylphosphonium acetate, tetrabutylphosphonium chloroacetate, tetrabutylphosphonium o-chlorobenzoate, tetrabutylphosphonium bicarbonate, tetrabutylphosphonium dihydrogenphosphate, tetrabutylphosphonium toluenesulfimidate, tetrabutylphosphonium benzenesulfinate, tetrabutylphosphonium toluenesulfonate, tetrabutylphosphonium bromide, ethyltriphenylphosphonium acetate-acetic acid complex, butyltriphenylphosphoniumi acetate, butyltriphenylphosphonium chloroacetate, butyltriphenylphosphonium o-chlorobenzoate, and butyltriphenylphosphonium bicarbonate; bis(triphenylphosphoranylidene) ammonium salts such as bis(triphenylphosphoranylidene)ammonium benzene sulfonate, bis(triphenylphosphoranylidene) ammonium chloride, bis(triphenylphosphoranylidene) ammonium tetrafluoroborate, bis(triphenylphosphoranylidene) ammonium dihydrogenphosphate, bis(triphenylphosphoranylidene) ammonium toluenesulfimidate, bis(triphenylphosphoranylidene) ammonium hydrogensulfate, bis(triphenylphosphorylidene) ammonium trifluoroacetate, and bis(triphenylphosphorylidene) ammonium hexafluorophosphate; quaternary ammonium salts such as tetramethyl ammonium chloride, tetramethyl ammonium trifluoroacetate, tetramethyl ammonium hexafluorophosphate, and tetramethyl ammonium tetrafluoroborate; ammonium salts such as ammonium hexafluorophosphate; alkali metal salts such as lithium hydroxide, lithium acetate, lithium chloride, lithium benzoate, lithium dihydrogenphosphate, lithium toluenesulfimidate, lithium o-chlorobenzoate, and lithium tetrafluoroborate; imidazoles or salts thereof such as 2,4-ethylmethyl imidazole, 2-methylimidazole, and $C_{11}H_{23}$-imidazole; as well as mixtures thereof.

Preferably, the catalyst is a bis(triphenylphosphoranylidene) ammonium salt or a organophosphonium salt. Most preferably, the catalyst is a polyorgano, pentavalent phosphorous compound which, when (1) the aromatic polycarbonate is prepared from bisphenol A and phosgene and has a weight average molecular weight of about 24,000,
(2) the polyepoxide is the diglycidylether of bisphenol A,
(3) the polycarbonate to polyepoxide ratio by weight is 42.5:57.5 and the amount of said catalyst is 0.015 mmoles per gram of the total weight of the polycarbonate and polyepoxide, and
(4) the polycarbonate, polyepoxide and catalyst are mixed together and the Secant Onset Temperature of the resultant mixture determined, results in said temperature being within the range extending from about 125° C. to the highest temperature at which said composition can be melt-processed without setting up. Such compounds are fully described in U.S. Pat. No. 5,037,903, which is hereby incorporated by reference in its entirety.

The term "catalyst" as used herein refers to both "initiators" or "catalysts" in various oxirane/ester or oxirane/carbonate reaction mixtures. As used herein, "Secant Onset Temperature" refers to the value on the temperature axis corresponding to the intersection of a straight line (drawn as a secant to the total heat flow versus temperature curve plotted by a DuPont 1090 Differential Scanning Calorimeter) and the interpolated base line of the exothermic peak signal of the resultant mixture determined, results in said temperature being within the range extending from above 125° C. to the highest temperature at which said composition can be melt-processed without deteriorating or prematurely setting up. The term "melt-processed" as used herein. means that the composition forms a solution or a homogeneous dispersion when melted and stirred.

The catalyst is employed in an amount sufficient to catalyze the reaction between the ester groups and the oxirane groups at a temperature below about 250° C. Preferably, the catalyst is employed in an amount in the range of from about 0.00015 to about 0.0300 mmoles per gram of the neat (epoxide and ester) reactants; the more preferred range is from about 0.00060 to about 0.0150 mmoles/g.

Suitable adhesion-enhancing materials for use as component (d) include polymeric materials different from component (b) with pendant epoxy groups and a glass transition temperature below about 50° C. Examples of such include epoxy resins containing a dispersion of a butadiene-nitrile rubbers (such as Kelpoxy TM G293-100, sold by NL or Reichold Chemicals), epoxy-functional phenoxy-type thermoplastic polymers (sold as Dow DER 664 TM by The Dow Chemical Company), epoxy-functional polyglycol ether polymers (sold as Dow DER 732 TM by The Dow Chemical Company), "toughened epoxy" blends of epoxy and phenolic resins containing tetrabromobisphenol A and sulfanilimide (sold as TACTIX 695 TM by The Dow Chemical Company), epoxy-capped polysulfide rubber (sold as ELP-3 by Morton Co.)..

The adhesion-enhancing material may also comprise a solution of a copolymer of an alkyl ester of an α,β-ethylenically unsaturated carboxylic acid and a hydroxyalkyl ester of an α,β-ethylenically unsaturated carboxylic acid, in a polyether polyol having a molecular weight of at least about 200. Suitable methods for the preparation of such a mixture are described in U.S. Pat. No. 4,731,416, which is hereby incorporated by reference in its entirety, and are available from The Dow Chemical Company. Examples of suitable alkyl esters which may be used in the preparation of such a mixture include butyl acrylate, ethyl acrylate, 2-ethylhexyl acrylate, butyl methacrylate, or other alkyl acrylate or methacrylates wherein the alkyl group has from 1 to 16 carbon atoms. Examples of suitable hydroxyalkyl ester include include hydroxyalkyl acrylate, hydroxyethyl acrylate, hydroxypropyl acrylate, hydroxybutyl acrylate, hydroxyethyl methacrylate, and hydroxypropyl methacrylate.

Preferably, the adhesion-enhancing material is an epoxy resin containing a dispersion of butadienenitrile rubbers or a mixture comprising an alkyl ester of an α,β-ethylenically unsaturated carboxylic acid and a hydroxyalkyl ester of an α,β-ethylenically unsaturated carboxylic acid in a polyether polyol having a molecular weight of at least about 200, is more preferably a higher molecular weight polyether polyol with a functionality of greater than 2.0, and is most preferably a mixture comprising butylacrylate and hydroxyethyl acrylate in a 4800 average molecular weight polypropyleneoxy triol. Such triols described in U.S. Pat. No. 4,731,416, and are available from The Dow Chemical Company.

The adhesion-enhancing material is preferably used in an amount sufficient to increase the lap shear strength of the resulting adhesive at least about 5 percent, relative to an adhesive composition prepared in the absence of the adhesion-enhancing material. However, the optimum amount to use in any particular adhesive composition will depend on the particular additive used, but may be readily determined by comparing the lap shear strength of formulations which contain varying levels of adhesion-enhancing material. In general, the adhesion-enhancing material is substantially compatible with surfactant/water-based hydrocarbon-based oils and is present in an amount sufficient to allow the adhesive to "wet" the substrate and/or displace any oily substances present on the surface of the substrate to be bonded, although excessive amounts may interfere with the strength of adhesive by reducing its cross-link density when cured. By "substantially compatible" it is meant that the adhesive composition does not undergo gross phase separation after the addition of the adhesion-enhancing material.

The lap shear strength of the adhesive formulation may be tested as described hereafter in Example 6. Preferably, the adhesion-enhancing additive is present in an amount sufficient to provide an adhesive with a lap shear strength of at least about 1800 psi, and more preferably at least about 2000 psi. The adhesion-enhancing materials cited herein have been discovered to advantageously allow the adhesive composition of the invention to bond to oily galvanized steel, with a high lap shear strength. Preferably, the adhesion-enhancing material is added in an amount, based on the weight of the adhesive, of at least about 2 percent, more preferably at least about 5 percent.

The adhesive composition of the invention may be prepared, for example, by either "melt-blending" the components, or by blending them in the presence of a suitable solvent. In a melt-blending process the components are mixed at an elevated temperature, and the mixture is then quenched to room temperature (about 25° C.) under conditions to provide a mixture which is storage-stable at ambient temperatures, but which will cure when further heated at elevated temperatures. The melt-blending process is preferably carried out in an extruder By "storage stable" it is meant that the viscosity of the adhesive will not increase more than about 200 percent after storage at 25° C. for 6 months, or during an "accelerated" test wherein the adhesive is stored at 50° C. for 2 weeks. More preferably, the viscosity of the adhesive will not increase more than about 100 percent under such conditions.

However, it may be desirable to allow the melt-blended mixture to remain at an elevated temperature four a period of time sufficient to allow the mixture to cure sufficiently so that the composition will hold a particular shape upon cooling.

The catalyst will generally be available dissolved as a solution. If the ester and/or polyepoxide is sufficiently fluid at a moderate temperature, the catalyst solution can be introduced as a spray or as a continuous or discontinuous stream, to a stirred or pump-circulated body of the ester and/or polyepoxide.

Thus, while in the thermoplastic (uncured or partially cured) state, the composition may readily be given a desired physical shape by such methods as extrusion, molding (compression, injection or transfer), pultrusion, lamination, coating or fiber drawing. Ultimate structural and environmental resistance properties can then be achieved in the subsequent cross-linking (thermosetting or curing) step.

Alternatively, the composition of the invention may be prepared by blending the components in the presence of a suitable solvent. Suitable solvents include inert solvents in general which are capable of forming a homogeneous dispersion or true solution when mixed with the polyepoxide and ester reactants and/or the less than fully cured reaction product, at temperatures below the Secant Onset Temperature. The solvent may be employed in any amount which will allow the components of the composition to be thoroughly blended, but is preferably used in an amount of about 30 to 200 percent of the weight of the other components. After mixing, the solvent is then substantially removed from the mixture by any suitable means.

Illustrative of the types of solvents which are suitable are chlorinated hydrocarbons (methylene chloride, for example), aromatics (toluene, for example), ketones (methyl ethyl ketone, for example) and ethers (dioxane, tetrahydrofuran, for example).

The adhesive composition of the invention also preferably contains a filler which will advantageously provide for a higher incidence of cohesive failure of the bonded substrate, relative to the incidence of adhesive failure "Adhesive failure", as used herein, refers to failure of a bonded substrate between the substrate and the adhesive. "Cohesive failure", as used herein, refers to failure of a bonded substrate within the adhesive itself, and would be evidenced by adhesive remaining on both substrates after failure. Cohesive failure is considered a preferred mode of failure since adhesive failure may be unpredictable and rapid along a lengthy substrate, and cohesive failure is generally indicative of higher peel strengths.

Suitable such fillers are finely divided particulate minerals which enhance the bonding of adhesives to oily substrates. Examples of such include talcs, calcium carbonates, aluminum powders, mica, and wallastonite (a calcium silicate available as Nyad TM 400 from Nyco Division of Processed Minerals Inc.), and magnesium aluminum silicates (available as Cyprufil TM from Cyprus Mineral Industries). The filler is employed in an amount, based on the weight of the adhesive of at least about 5 percent, more preferably at least about 15 percent, and most preferably at least about 25 percent; and is preferably no greater than about 100 percent; more preferably no greater than about 75 percent, and most preferably no greater than about 50 percent.

In a second aspect, this invention is a method for bonding two substrates which comprises: applying the adhesive composition of the first aspect of the invention between two substrates and heating the adhesive under conditions sufficient to at least partially wet the substrates and cure the adhesive. The adhesive used in the process of the invention may be prepared in the same manner as the adhesive of the first aspect of the invention. The adhesive may be applied to the substrates by any suitable means, but is preferably applied as a film adhesive which is placed between two substrates which are held in contact with the adhesive while the adhesive is heated and allowed to cure. The adhesive and substrates may be heated to any temperature which will allow the adhesive to cure sufficiently, but is preferably cured at a temperature above about 125° C. In addition, the application of pressure to the substrates during the curing process will improve the wetting of the adhesive, improving its adhesion to the substrates.

As mentioned above, the adhesive of the invention provides a structural adhesive which is particularly useful for the bonding of metal substrates. The adhesive of the invention advantageously provides improved adhesive properties, such as lap shear strength and peel strength when used to bond metal substrates, particularly oily metal substrates, relative to epoxy/polycarbonate/polyester compositions which do not contain the adhesion-enhancing material of component (d) of the adhesive of the invention. In addition, the adhesive composition of the invention is also suitable for use in bonding other types of substrates, such as plastic composite materials (e.g., sheet molding compound), and as part of a fiberglass/adhesive composite, which composites are useful for structural reinforcement, particularly metal substrates. The process of the invention provides bonded substrates which possess improved lap shear strength and peel strength properties. These properties may be measured by any suitable technique, examples of which are set forth in Examples 6 and 8 below. The adhesive of the invention also provides improved storage stability at ambient conditions, relative to the typical epoxy and polyurethane structural adhesives described above. The storage stability of adhesives may be compared by storing them at ambient temperatures for six months, and then comparing their viscosity, or by conducting an "accelerated aging" test by heating the adhesives for 2 weeks at 50° C. and comparing their viscosity.

ILLUSTRATIVE EMBODIMENTS

The following examples are given to illustrate the invention and should not be interpreted as limiting it in any way. Unless stated otherwise, all parts and percentages are given by weight.

EXAMPLE 1

Preparation of a melt-blended butadiene-nitrile rubber-modified film adhesive (35 percent rubber level).

A 2 L round bottomed flask is charged with 82 g of an epoxy resin (DER 332 TM, sold by The Dow Chemical Company), 790 g of an epoxy-capped butadiene-nitrile rubbers (Kelpoxy G293-100, nominally 53.4 percent rubber fraction), and 1.03 g of bis(triphenylphosphoranylidene) ammonium benzene sulfonate (an initiator), and heated at 100° C. under vacuum while slowly rotating the flask. A portion of this mixture, 726 g, is placed in a bowl on a paddle mixer then 274 g of dry ground bisphenol A polycarbonate is slowly blended into the resin. The heating zones on a conrotating twin screw extruder are preheated at 180° C., 210° C., and 230° C., successively, with the die heated to 175° C. The feed zone is water cooled; a screen pack of two 40 mesh+two 60 mesh+two 100 mesh screens is placed ahead of the breaker plate and die. The above mixture is fed, melt-blended and extruded at a screw speed,of about 70 rpm (residence time about 1 minute) so the hot melt can be puddled and taken up between two sheets of release paper on chilled calendering rolls to give a film 0.254 mm thick. Titration for epoxide groups shows about 5.0 percent mole is reacted during the melt-blending process. Film is stored at room temperature prior to evaluation.

EXAMPLE 2

Preparation of melt-blended butadienenitrile rubber-modified film adhesive (25 percent rubber level)

A 2 L round bottomed flask is charged with 246 g of an epoxy resin (DER 332 TM), 541 g of Kelpoxy rubber concentrate G293-100, and 1.03 g of bis(triphenylphosphoranylidene) ammonium benzene sulfonate, (an initiator) and heated at 100° C. under vacuum while slowly rotating the flask. A portion of this mixture, 684 g, is placed in a bowl on a paddle mixer, then dry ground bisphenol A polycarbonate, 316 g, is slowly blended into the resin. The heating zones on a conrotating twin screw extruder are preheated at 180° C., 210° C., and 230° C., successively, with the die heated to 175° C. The feed zone is water cooled; a screen pack of four 40 mesh+two 60 mesh screens is placed ahead of the breaker plate and die.

The above mixture is fed, melt-blended and extruded at a screw speed of about 70 rpm (residence time about 65 seconds) so the hot melt can be puddled and taken up between two sheets of release paper on chilled calendering rolls to give a film 8 to 12 mils thick. Titration for epoxide groups shows about 6.5 percent mole is consumed during the melt-blending process. Film is stored at room temperature prior to evaluation.

EXAMPLE 3

Preparation of a melt-blended butadienenitrile rubber-modified film adhesive (15 percent rubber level)

A 2 L round bottomed flask is charged with epoxy resin DER 332 TM, 412 g, Kelpoxy rubber concentrate G293-100, 324 g, and bis(triphenylphosphoranylidene) ammonium benzene sulfonate (an initiator), 1.20 g, and heated at 100° C. under vacuum while slowly rotating the flask. A portion of this mixture, 640 g, is placed in a bowl on a paddle mixer, then dry ground bisphenol A polycarbonate, 360 g, is slowly blended into the resin. The heating zones on a conrotating twin screw extruder are preheated at 180° C., 210° C., and 230° C., successively, with the die heated to 180° C. The feed zone is water cooled; a screen pack of two 40 mesh+two 60 mesh+two 80 mesh screens is placed ahead of the breaker plate and die. The above mixture is fed, melt-blended and extruded at a screw speed of about 60 rpm (residence time about 80-90 seconds) so the hot melt can be puddled and taken up between two sheets of release paper on chilled calendering rolls to give a film 8 to 12 mils thick. Titration for epoxide groups show about 5.3 percent mole are consumed during the melt-blending process. Film is stored at room temperature prior to evaluation.

EXAMPLE 4

Preparation of solvent-blended and cast film adhesives

General method: The components of the adhesive composition, including epoxy resin, polycarbonate, and flexibilizing compound, are mixed together in methylene chloride as solvent so as to give a final non-volatile level of between 20 and 50 percent. An amount of bis(-triphenylphosphoranylidene) ammonium chloride (an initiator), is added to make the concentration 1.5 micromoles of initiator per gram on a solid basis. The solutions are cast using a blade with a clearance of 0.025 inch onto a sheet of release paper, then allowed to air dry. Residual methylene chloride is removed by heating at 70° C. for 30 minutes in a forced air oven. Films are stored at room temperature. The following compositions, shown in weight percent, are prepared as film adhesives:

| Sample | Polycarbonate | DER 332 ™ | Kelpoxy | DER 664 ™ | DER 732 ™ | Tactix 695 | ELP |
| --- | --- | --- | --- | --- | --- | --- | --- |
| 4 a | 38.0 | 43.2 | 18.8 | — | — | — | — |
| 4 b | 27.4 | 6.8 | 65.8 | — | — | — | — |
| 4 c | 33.8 | 28.6 | 37.6 | — | — | — | — |
| 4 d | 29.5 | 14.1 | 56.4 | — | — | — | — |
| 4 e | 11.7 | — | — | 88.3 | — | — | — |
| 4 f | 28.0 | — | — | — | 72.0 | — | — |
| 4 g | 16.4 | — | — | — | — | 83.6 | — |
| 4 h | 40.1 | 53.8 | — | — | — | — | 6.1 |
| 4 i | 34.7 | 47.8 | — | — | — | — | 17.5 |
| 4 j | 31.6 | 38.0 | — | — | — | — | 30.4 |
| 4 k | 27.4 | 30.1 | — | — | — | — | 42.5 |

Kelpoxy is Kelpoxy G293-100 Epoxy-capped butadiene-nitrile rubber
DER 664 ™ is epoxy functional capped phenoxy-type thermoplastic modifier
DER 732 ™ is epoxy functional capped poly glycol ether modifier
Tactix 695 is epoxy resin forming thermoplastic segments in situ in cure
ELP is epoxy functional capped polysulfide rubber (Morton Co.)

EXAMPLE 5

Evaluation of Modified Film Adhesives

Lap shear samples are made and tested using 25.4 mm by 101.6 mm by 0.762 mm coupons of galvanized steel coated with stamping oil. The non-bonding side of the coupon is sprayed with mold release (Tel-X, a fluorocarbon-based mold release composition, available from National Chemsearch), then half inch strips of film adhesive cut and applied to the end of the bonding side. Mold release coated shims are put in place to give a 0.127 mm thick bond-line and the second coupon placed to give a 12.7 mm bond overlap. The lap shear samples are placed in a vise pre-heated to 350° F. the vise tightened, then the assembly set in a forced air oven at 350° F. Solvent cast films (Example 4) are cured for 30 minutes; melt-blended films (Examples 1, 2, and 3) are cured for 2 hours. Degassed samples are cured 2 hours at 300° F., then 1 hour at 350° F. The vise is removed and allowed to cool to room temperature. Single lap shear specimens are pulled at 13 mm per minute and the applied force at failure recorded. Results are shown in the table starting on the next page:

| Example/Sample | Lap Shear Strength, psi | Failure Mode | Notes |
| --- | --- | --- | --- |
| 1 | 1980 | Adhesive | 35% Kelpoxy |
| 2 | 1910 | " | 25% Kelpoxy |
| 3 | 1675 | " | 15% Kelpoxy |
| 4 a | 1690 | " | |
| 4 b | 1910 | " | |
| 4 c | 1545 | " | |
| 4 d | 1560 | " | |
| 4 e | 1950 | " | |
| 4 f | 1450 | " | |
| 4 g | 1860 | " | |
| 4 h | 1562 | " | 5% ELP |
| 4 i | 1759 | " | 15% ELP |
| 4 j | 1908 | " | 25% ELP |
| 4 k | 2052 | " | 35% ELP |

EXAMPLE 6

Film Adhesives Modified with Dow XUS-16503

XUS-16503 is a mixture of a n-butyl acrylate/hydroxyethyl acrylate rubber in a 5000 MW triol, available from The Dow Chemical Company. The following weight percent compositions are solution blended and cast as films following the same procedure as detailed in Example 5 above:

| Example | Polycarbonate | DER 332 ™ | XUS-16503 |
| --- | --- | --- | --- |
| 6 a | 40.4 | 54.6 | 5.0 |
| 6 b | 38.2 | 51.8 | 10.0 |
| 6 c | 36.1 | 48.9 | 15.0 |

Lap shear specimens are prepared from adhesive film Samples 6 a–c and from those of Examples 1–3 following the method described in Example 5 above except the specimen overlap distance is ¼ inch instead of ½ inch. Specimens are cured 2 hours at 300° F.+1 hour at 350° F. and the lap shear strength determined as described above. The results are presented below:

| Example/Sample | Lap Shear Strength, psi | Failure Mode | Notes |
| --- | --- | --- | --- |
| 1 | 3017 | Adhesive | 35% Kelpoxy |
| 2 | 2975 | " | 25% Kelpoxy |
| 3 | 2402 | " | 15% Kelpoxy |
| 6 a | 3750 | " | 5% XUS |
| 6 b | 3883 | " | 10% XUS |
| 6 c | 2123 | " | 15% XUS |

EXAMPLE 7

Film Adhesive Modified with Dow XUS-16503 and Particulate Mineral

Cyprufil 200 is a particulate mineral filler (predominantly chlorite) supplied by Cyprus Mineral Ind. XUS-16503 is a mixture of a n-butyl acrylate/hydroxyethyl acrylate rubber in a 5000 MW triol. The following weight compositions are solution blended and cast as films following the same procedure as detailed in Example 5 above:

| Sample | Polycarbonate g | DER ™ 332 g | XUS-16503 g | Cyprufil g | Methylene Chloride g |
| --- | --- | --- | --- | --- | --- |
| 7 a | 37.8 | 52.2 | 10.0 | 20.0 | 273.4 |
| 7 b | 37.8 | 52.2 | 10.0 | 30.0 | 273.4 |
| 7 c | 37.8 | 52.2 | 10.0 | 40.0 | 273.4 |
| 7 d | 33.6 | 46.4 | 20.0 | 20.0 | 260.8 |
| 7 e | 33.6 | 46.4 | 20.0 | 30.0 | 260.8 |
| 7 f | 33.6 | 46.4 | 20.0 | 40.0 | 260.8 |

Evaluation of Modified Mineral Filled Film Adhesives

Lap shear samples are made and tested using 25.4 mm by 101.6 mm by 0.762 mm coupons of galvanized steel coated with stamping oil. The non-bonding side of the coupon is sprayed with mold release, then half inch strips of film adhesive cut and applied to the end of the bonding side. They are placed in an oven at 95° C. under vacuum and held for 1 hour; coupons are then cooled. Then for all samples, mold release coated shims are put in place to give a 0.127 mm thick bond-line and the second coupon placed to give a 12.7 mm bond overlap. The lap shear samples are placed in a vise pre-heated to 350° F., the vise tightened, then the assembly set in a forced air oven at 350° F. Samples are cured 1 hour at 350° F. The vise is removed and allowed to cool to room temperature. Single lap shear specimens are pulled at 13 mm per minute and the applied force at failure recorded. Results are shown in the table below:

| Sample | Lap Shear Strength, psi | Failure Mode | Notes |
| --- | --- | --- | --- |
| 7 a | 1730 | Cohesive | 10% XUS, 20 phr Cyp. |
| 7 b | 2136 | Cohesive | 10% XUS, 30 phr Cyp. |
| 7 c | 2199 | Cohesive | 10% XUS, 40 phr Cyp. |
| 7 d | 1658 | Cohesive | 20% XUS, 20 phr Cyp. |
| 7 e | 1701 | Cohesive | 20% XUS, 30 phr Cyp. |
| 7 f | 1907 | Cohesive | 20% XUS, 40 phy Cyp. |

Modified T-peel samples are made and tested using 25.4 mm by 101.6 mm by 0.762 mm coupons of galvanized steel coated with stamping oil. The non-binding side of the coupon is sprayed with mold release, then two and one half inch strips of film adhesive cut and applied to the end of the bonding side. They are placed in an oven at 95° C. under vacuum and held for 1 hour; coupons are then cooled. Then for all samples, mold release coated shims are put in place to give a 0.127 mm thick bond-line and the second coupon placed to give a 63.5 mm bond overlap. T-peel samples are placed in a vise pre-heated to 350° F., the vise tightened, then the assembly set in a forced air oven at 350° F. Samples are cured 1 hour at 350° F. The vise is removed and allowed to cool to room temperature. Bonded samples are placed in a guide jig and the last one half inch of the non-bonded end of adherents is bent around a ⅜ inch diameter rod until it is at 90 degrees to the rest of the specimen (i.e., in a "T" conformation). Peel specimens are clamped in the jaws of an Instron by the short branch of the "T" and pulled at 13 mm per minute and applied force at various crack propagation distances recorded. The observed force is mathematically compensated for the changing moment of applied force to give the average peel strength per linear width of sample. Results are shown in the table below:

| Sample | Peel Strength, pli | Failure Mode | Notes |
| --- | --- | --- | --- |
| 7 b | 41 | Cohesive | 10% XUS, 30 phr Cyp. |
| 6 b | 16 | Adhesive | 10% XUS |

The above data shows how the properties of the adhesive may be adjusted by the addition of an inorganic filler. For some applications, cohesive failure and higher "T-peel" strengths obtained by the addition of an inorganic filler may be desirable.

EXAMPLE 8

Film Adhesive Modified with Dow XUS-16503 and Particulate Mineral

Wollastokup 20714 is a particulate mineral filler (predominantly wallastonite, chemically surface modified) supplied by Nyco Minerals Inc. XUS-16503 is a mixture of a n-butyl acrylate/hydroxyethyl acrylate rubber in a 5000 MW triol. The following weight compositions are solution blended and cast as films following the same procedure as detailed in Example 5:

| Example | Polycarbonate g | DER ™ 332 g | XUS-16503 g | Wollastokup g | Methylene Chloride g |
| --- | --- | --- | --- | --- | --- |
| 8 a | 37.8 | 52.2 | 10.0 | 20.0 | 273.4 |
| 8 b | 37.8 | 52.2 | 10.0 | 30.0 | 273.4 |
| 8 c | 37.8 | 52.2 | 10.0 | 40.0 | 273.4 |
| 8 d | 33.6 | 46.4 | 20.0 | 30.0 | 260.8 |

Lap shear samples are prepared and evaluated as described in Example 5; results are shown in the table below.

| Sample | Lap Shear Strength, psi | Failure Mode | Notes |
| --- | --- | --- | --- |
| 8 a | 1752 | Adhesive | 10% XUS, 20 phr Wol. |
| 8 b | 1752 | Adhesive | 10% XUS, 30 phr Wol. |
| 8 c | 1765 | 50/50 Adhesive/-Cohesive | 10% XUS, 40 phr Wol. |
| 8 d | 1715 | Adhesive | 20% XUS, 20 phr Wol. |

EXAMPLE 9

Preparation of Melt Blended 10% XUS-16503 Modified Film Adhesive

A 2 L round bottom flask was charged with epoxy resin DER 332 ™, (trademark of The Dow Chemical Company) 620 g, modifier XUS-16503, 120 g and initiator bis(triphenylphosphoranylidene) ammonium benzene sulfonate, PNP-BS, 1.20 g, and mixed at 100° C. under vacuum for about 1 hour. A portion of this mixture, 583 g, was placed in a bowl, then mixed with 383 g of dry ground polycarbonate on a Hobart paddle mixer. The heating zones on a Brabender CTSE-V twin screw extruder were preheated at 165° C., 185° C., and 205° C., successively, with the die heated to 175° C. The feed zone was water cooled; a screen pack of one 40 mesh screen was placed ahead of the breaker plate and die. The above mixture was fed, melt blended and extruded at a screw speed of about 50 rpm so the hot melt could be puddled and taken up between two sheets of release paper on chilled calendering rolls to give a film 10 mils thick.

What is claimed is:

1. An adhesive composition comprising
   (a) an aromatic polyester or aromatic polycarbonate,
   (b) a polyepoxide,
   (c) an effective amount of an initiator or catalyst for the reaction of carbonate or ester groups in the aromatic polycarbonate or aromatic polyester with oxirane groups in the polyepoxide, and
   (d) from about 1 to about 50 weight percent of an adhesion-enhancing material of (i) a polymeric material different from (b) having a glass transition temperature below about 50° C. that is a blend of epoxy and phenolic resin containing tetrabromobisphenol A and sulfanilimide, or an epoxy-capped polysulfide rubber, or (ii) a solution of a copolymer of an alkyl ester of an $\alpha,\beta$-ethylenically unsaturated carboxylic acid and a hydroxyalkyl ester of an $\alpha,\beta$-ethylenically unsaturated carboxylic acid, in a polyether polyol having a molecular weight of at least about 200;
   wherein the number ratio of oxirane groups in component (b) to the sum of the number of ester groups and twice the number of carbonate groups in component (a), is in the range of from about 0.8:1 to about 1.4:1.

2. The composition of claim 1 wherein the equivalent ratio of oxirane:ester groups is at least about 0.95:1.

3. The composition of claim 1 wherein the equivalent ratio of oxirane:ester groups is no greater than about 1.1:1.

4. The composition of claim 1 wherein the adhesion-enhancing material is a copolymer comprising a butylacrylate and a hydroxyethyl acrylate in a 4800 average molecular weight polypropyleneoxy triol.

5. The composition of claim 1 wherein the adhesion-enhancing material is used in an amount sufficient to increase the lap shear strength of the resulting adhesive at least about 5 percent, relative to an adhesive composition prepared in the absence of the adhesion-enhancing material.

6. A fiberglass/adhesive composite comprising a first layer of a flexible fiberglass material superimposed on a second layer which comprises the adhesive composition of claim 1.

7. A method for bonding two substrates which comprises applying the adhesive composition of claim 1 between two substrates and heating the adhesive under conditions sufficient to at least partially wet the substrates and cure the adhesive.

8. The method of claim 7 wherein the adhesive is cured at a temperature above about 125° C.

9. An adhesive composition comprising
   (a) an aromatic polyester or aromatic polycarbonate,
   (b) a polyepoxide,
   (c) an effective amount of an initiator or catalyst for the reaction of carbonate or ester groups in the aromatic polycarbonate or aromatic polyester with oxirane groups in the polyepoxide, and
   (d) an adhesion-enhancing material of a solution of a copolymer of an alkyl ester of an $\alpha,\beta$-ethylenically unsaturated carboxylic acid and a hydroxyalkyl ester of an $\alpha,\beta$-ethylenically unsaturated carboxylic acid in a polyether polyol having a molecular weight of at least about 200.

* * * * *